United States Patent [19]

Bacardit

[11] Patent Number: 4,461,321

[45] Date of Patent: Jul. 24, 1984

[54] ROTARY HYDRAULIC DISTRIBUTOR FOR HYDRAULIC POWER-DRIVE SYSTEMS

[75] Inventor: Juan S. Bacardit, Barcelona, Spain

[73] Assignee: Bendiberica S.A., Barcelona, Spain

[21] Appl. No.: 382,004

[22] Filed: May 25, 1982

[30] Foreign Application Priority Data

May 26, 1981 [ES] Spain .................................. 502483

[51] Int. Cl.³ .......................... F16K 11/02; F15B 13/04
[52] U.S. Cl. ................................ 137/625.21; 91/375 R
[58] Field of Search ........................ 91/375 A, 375 R; 137/625.21, 625.22, 625.23, 625.24

[56] References Cited

U.S. PATENT DOCUMENTS

| 1,947,991 | 2/1934 | Jessup | 121/41 |
| 4,217,932 | 8/1980 | Bacardit | 137/625.21 |
| 4,310,024 | 1/1982 | Bacardit | 91/375 R |
| 4,335,749 | 6/1982 | Walter | 137/625.22 |

FOREIGN PATENT DOCUMENTS

| 8252 | 2/1979 | European Pat. Off. . |
| 21970 | 1/1981 | European Pat. Off. . |
| 1480666 | 6/1969 | Fed. Rep. of Germany . |
| 1308992 | 3/1973 | United Kingdom . |

*Primary Examiner*—Alan Cohan
*Assistant Examiner*—Mark Malkin
*Attorney, Agent, or Firm*—Larry J. Palguta; Paul D. Schoenle; Ken C. Decker

[57] ABSTRACT

The hydraulic distributor, more particularly for power steering systems of vehicles, comprises two rotary members (1–3, 9) which are so designed as to form a substantially disc-shaped cavity (8) divided up in at least one pair of working chambers (28) by arms (13, 14) belonging to one (9) of said members (or rotor). These arms cooperate with inlet (18) and outlet (24) ports in the other member (1) (or stator) so as to form control valve means for controlling activation fluid flow supplied from a pressure generating source (26). The rotor (9) has at least one intermediate arm (33) which extends into each of the chambers of the pair of working chambers (28, 43) and which cooperates with fluid passage ports (36) in the stator in order to form additional fluid flow control valve means. The first portion (of zero slope) of the torque/activation pressure curve of the distributor is controlled by the closing edge (41a) of the intermediate arm (33a) oriented towards the arm (14) which is associated with the outlet port (24) and also by the closing edge (38) of the arm (14) which is associated with outlet port (24) which closing edge is oriented towards the intermediate arm (33) extending into the preceeding working chamber (28, 43a).

6 Claims, 8 Drawing Figures

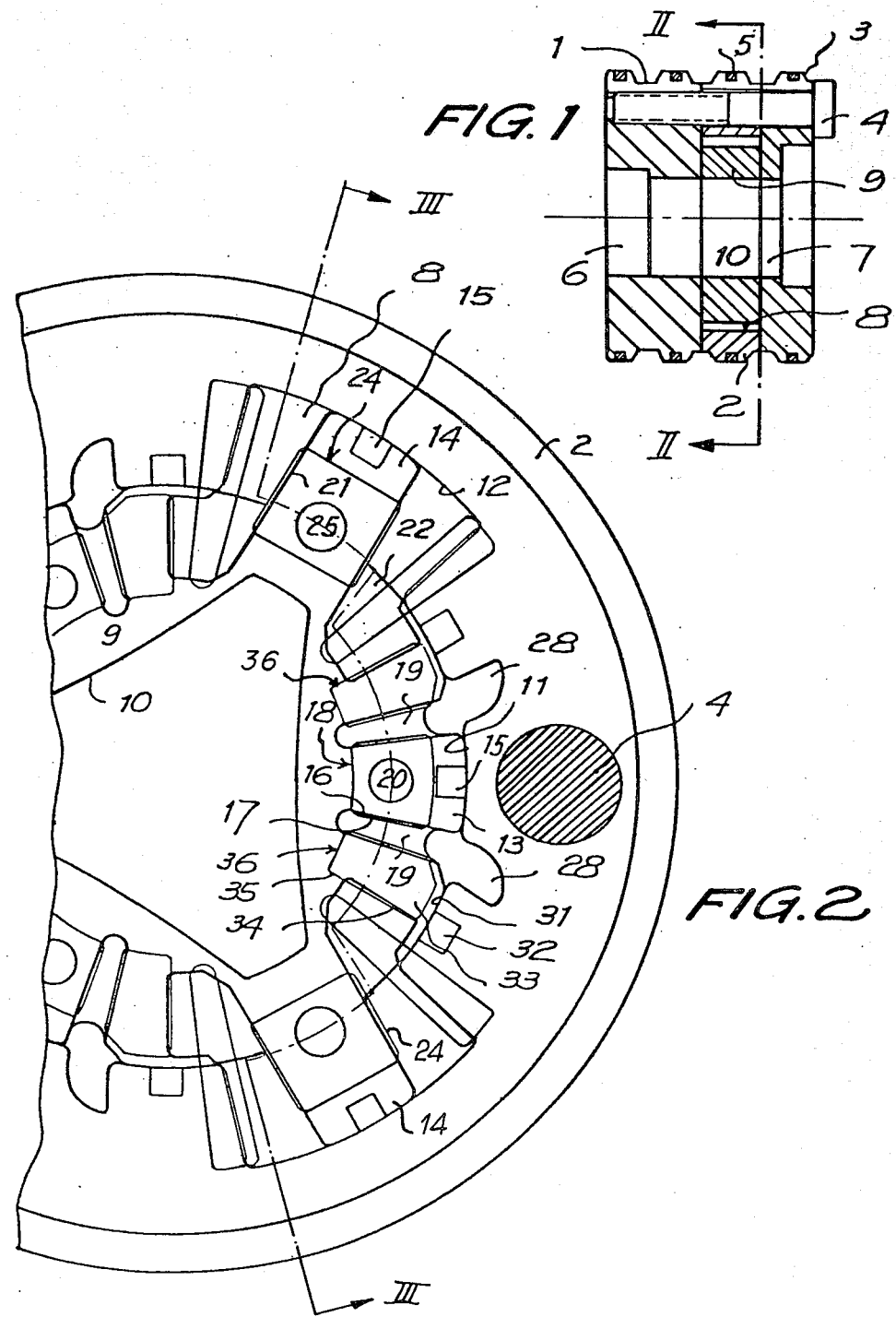

ROTARY HYDRAULIC DISTRIBUTOR FOR HYDRAULIC POWER-DRIVE SYSTEMS

This invention relates to rotary hydraulic distributors for hydraulic power drive systems, more particularly for power steering systems of automotive vehicles. This distributor comprises two members which are capable of relative rotation one with respect to the other and which are respectively connected to an input control device and to an output device. Both members form together a substantially disc-shaped cavity divided into at least one pair of working chambers by arms which protrude radially from one of said members. The distributor also include means for connecting the working chambers with either end of a double-acting driving cylinder, while the arms cooperate with inlet and outlet ports formed in the other of said members so as to form fluid flow control valve means for controlling the fluid flow originating from a pressure fluid source. Said first member has at least one intermediate arm which extends into each one of said working chambers and cooperates with passage ports formed in the other member in order to provide additional fluid flow control valve means, the valve means associated to the arms being selectively operated according to the relative rotation between the two members in order to control selected successive portions of the driving torque/outlet operating pressure characteristic curve of the distributor.

With such a distributor, it is thus possible to exert on the driving input mechanism, typically the steering column of an automotive vehicle, reactions of varying intensity depending on whether the vehicle is running following a straight line, a slight curve, a sharper curve or whether the vehicle is performing parking manoeuvre. These conditions each correspond to successive portions of different slopes of the driving torque/oulet pressure characteristic curve of the distributor, as required by certain regulations.

In prior systems which have been developed by the Applicant, the third section of the characteristic curve (sharp curves or parking manoeuvres) is controlled by a second pair of rotating members having own arms dimensioned and positioned so as to perform the third reaction, additional control valve means, actuated by the system itself, being provided to actuate this second pair of members when the operational conditions of the system so require. It has also been contemplated to use intermediate arms shaped in such a way so as to control the last two sloped portions of the characteristic curve.

This is an object of the present invention to provide a hydraulic distributor of the above class, which embodies only one pair of rotating members and which permits, in a simplified arrangement, at lower production costs and with an increased reliability, to control the full extent of the three basic portions of the characteristic curve, including the first zero slope portion which corresponds to a straight line motion of the vehicle, this distribution system thus providing modulable reactions in accordance to the requirements of all current operational conditions.

In order to meet this object and other, according to a feature of the present invention, in the rotating hydraulic distributor of the above mentioned type, the first (zero slope) portion of the characteristic curve is controlled by a closing edge of the intermediate arm which edge is oriented towards the arm cooperating with the outlet port, and by the closing edge of the arm cooperating with the outlet port which is oriented towards the adjacent intermediate arm which extends into the preceeding working chamber.

According to a feature of the invention, the closing edge of the arm which cooperates with the outlet port is shaped as a step, the tread of which defines with the closing edge of the associated outlet port a flow passage whose section is larger than the maximum section provided by the intermediate arm, the riser or stepped edge adjacent to said tread forming a closing edge cooperating with the edge of said outlet port in such a manner that the flow passage section defined therebetween will be smaller than the corresponding flow passage section as provided by the intermediate arm at the transition point between the first and second portions of the torque/pressure characteristic curve.

Other features and advantages of the present invention will appear from the following description and enclosed drawings of preferred embodiments which are given as illustrative but not limitative purposes, in which:

FIG. 1 is a schematic axial cross-section of a distributor according to the present invention;

FIG. 2 is a partial transverse cross-section along the line II—II of FIG. 1;

Figure 3:
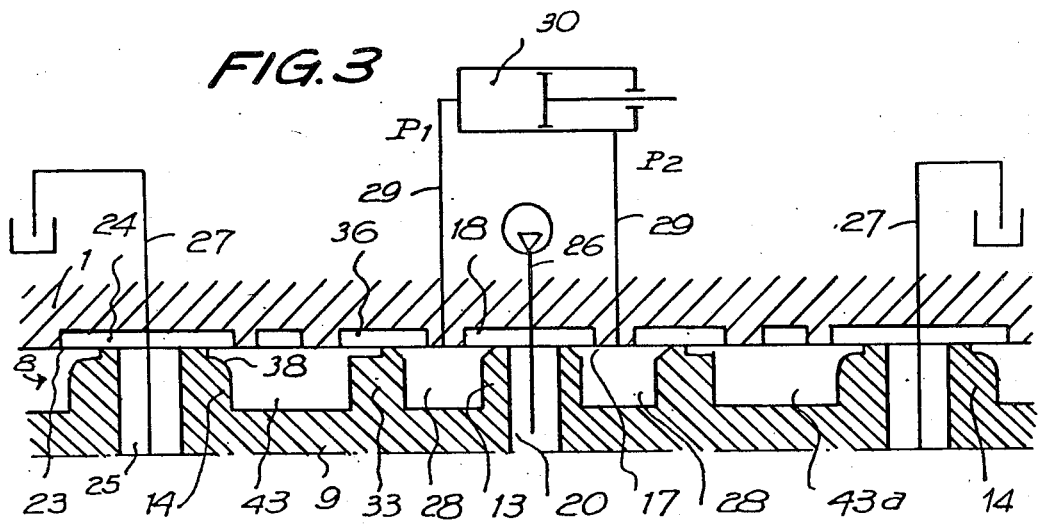
FIGS. 3 to 7 are cross-sections along the line III—III on FIG. 2, depicting several angular operational positions which correspond to points 0.1-2-3-4 on the torque/pressure characteristic curve.
Figure 4:
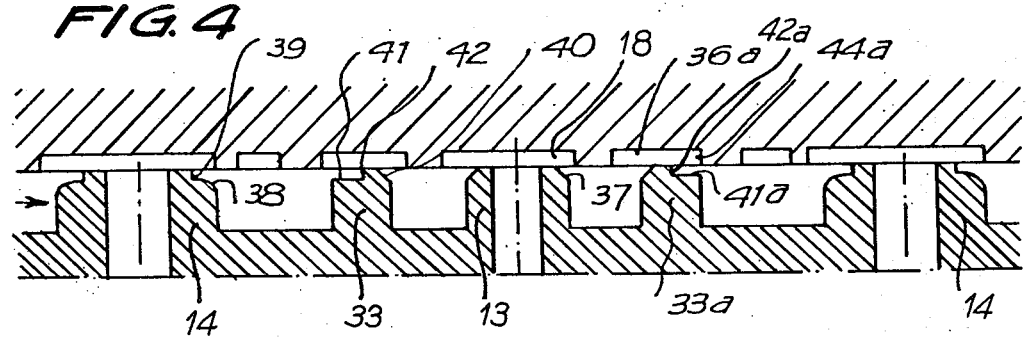
Figure 5:
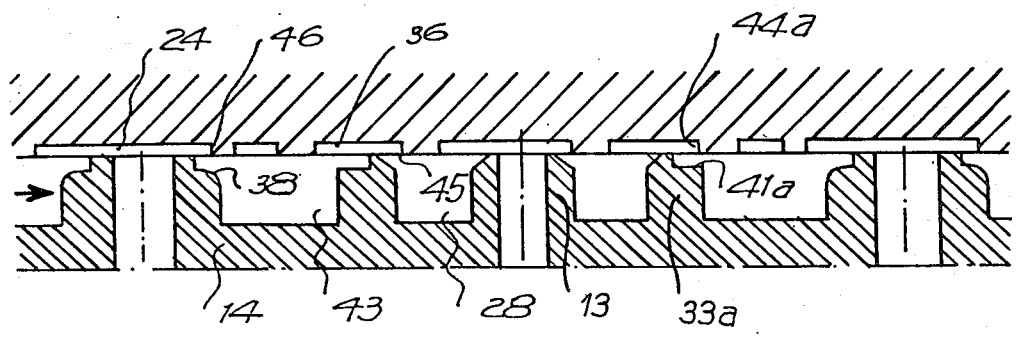
Figure 6:
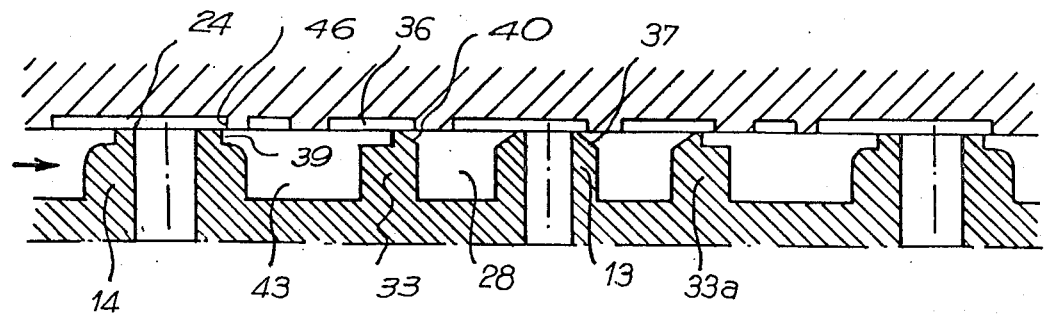
Figure 7:
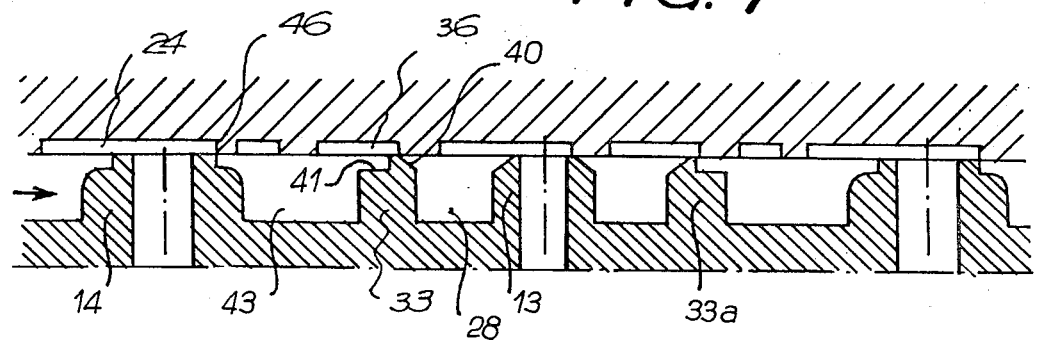

As illustrated in FIG. 1, a distributor according to the invention comprises an assembly of three coaxial annular pieces 1, 2 and 3 which are secured together by screws, said assembly forming the first of two mutually rotating members and said assembly may be integrated, in any conventional manner, into a sealed enclosure with seals 5 cooperating with the inner sides of a stationary housing, such as a power-steering box, while being connected to a drive output shaft. Both terminal annular pieces 1 and 3 have axial transversing holes 6 and 7 in the shape of a three-pointed star, as illustrated in FIG. 2, these holes providing slack passage, as known in the art, for a driving control shaft (not illustrated) connected to a driving wheel. The intermediate annular piece 2 and the axially opposed or facing faces of annular pieces 1 and 3 define a substantially disc-shaped cavity, referenced as 8. In a manner which is also known in the art, a rotor 9 is hermetically received between the axially opposed inner faces of terminal annular pieces 1 and 3. The central triangular-section shaped control shaft is fitted into a triangular opening 10 of the rotor. The arrangement is such that the rotor 9 is driven into rotation in both directions by the central shaft, the latter being however capable of being tilted by a predetermined small angle in the holes 6 and 7 in the terminal annular pieces 1, 3, whereby allowing slight relative rotation between both rotating members.

The profile of the inner surface of the intermediate or central annular piece 2 is made up of two successive coaxially arranged series of angularly equidistant cylindrical area segments, e.g. three cylindrical segments of a smaller diameter 11 alternating with three cylindrical segments of a larger diameter 12. The rotor 9 has three short arms 13 and three long arms 14 whose radial end faces sealingly contact, by means of seals 15, the respective cylindrical area segments 11 and 12. The short rotor arms 13 have radially extending closing edges 16 which cooperate as an open center valve means together with complementary edges 17 of the inlet ports 18 formed in facing relationship in the axially opposed inner faces of the terminal annular pieces 1 and 3. The radial closing edges 16 are limited by radially extending grooves 19 which extend inwardly towards the interior of the rotor body and open into the disc-shaped cavity. In addition, the facing inlet ports 18 intercommunicate axially through holes 20 drilled through the short rotor arms 13. On the other hand, the long rotor arms 14 also have radially extending closing edges 21, partially limited by grooves 22 in the rotor, similar to grooves 19, which operate as an open center valve means together with corresponding closing edges 23 of outlet ports 24 which are also formed in a facing relationship in the axially opposed inner faces of the terminal annular pieces 1 and 3 and which intercommunicate axially through holes 25 machined through the long (outlet) rotor arms 14.

The inlet ports 18 receive the actuating fluid under pressure from the vehicle power steering circuit pump through a piping system which is not illustrated here but merely indicated by reference 26 on FIG. 3. The outlet ports 24 are connected to the discharge or return side by a piping system indicated under reference 27 in FIG. 3. Furthermore, the working chambers 28 which are formed inside the disc-shaped cavity on both sides of each short (inlet) rotor arm are in fluid communication with the corresponding ends of the power-steering driving cylinder 30 by conduits which are indicated under reference 29 in FIG. 3.

The inside surface of the intermediate annular piece has in addition three other cylindrical area segments 31 which sealingly cooperate, by means of seals 32, with the radial end surfaces of corresponding intermediate arms 33 of the rotor each formed between each short (inlet) rotor arm and each adjacent long (outlet) rotor arm. These intermediate arms also have radially extending lateral closing edges 34 which, in turn, cooperate with complementary closing edges 35 of passage ports 36 formed in facing relationship in the axially opposed inner faces of the two terminal annular pieces 1 and 2, each between adjacent inlet and outlet ports.

The closing edges of the various arms as described in relation to FIG. 2, which are only illustrated schematically, have certain important features according to the invention and will therefore be described in more detail in relation to FIGS. 3 to 7.

With reference to FIGS. 3 to 7, it will be noticed that the short (inlet) rotor arms 13, which are associated to the inlet ports 18, have both their closing edges bevelled, as shown at 37. On the other hand, the closing edges 21 of the long (outlet) rotor arms 14 are in the shape of a step consisting of a protruding rounded tread 38 and a recessed straight riser 39. The intermediate arms have bevels or chamfers 40 on the side thereof facing the inlet arms 13 and, on the opposite side facing the outlet arms 14, a step-shaped profile consisting of an external flat tread 41 and of a straight internal riser 42. The respective sizes of arms, inlet ports, outlet ports and passage ports are designed in respect to each other so that the different pairs of complementary closing edges will work differentially depending on the relative angular position of the two rotating members 1-3 and 9.

In the neutral or rest condition, as illustrated in FIG. 3, the oil which is pressure-fed by the pump via conduits 26, flows towards the outlet conduits 27 via inlet ports 18, working chambers 28, passage ports 36, chambers 43 and outlet ports 24. In this configuration and in accordance with the open center valve principle, the oil which comes from the inlet ports 26 is evenly distributed and flows symmetrically towards the adjacent outlet circuits 27, whereby providing a balanced condition between the pressures prevailing in the two chambers of each pair of working chambers, e.g. between both ends of the driving piston 30 which is consequently kept idle.

Figure 8:
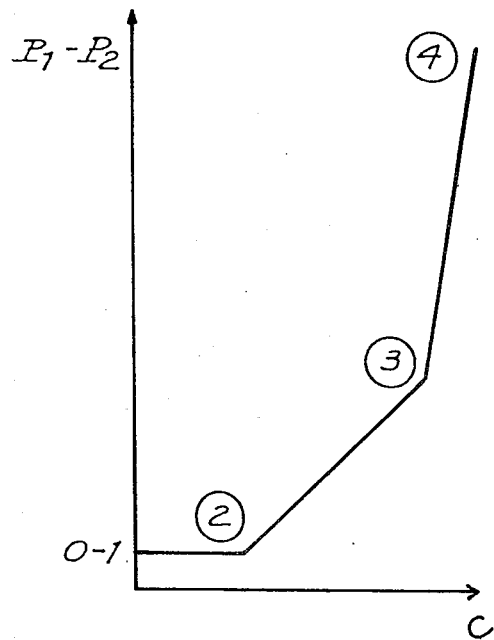
FIG. 8 is the torque/pressure characteristic curve of a hydraulic distributor as illustrated in the above figures.

When the steering wheel actuates the rotor 9 to cause same to rotate in the direction indicated by arrows in FIGS. 4 to 7 (towards the right), during a first operational phase which corresponds to the portion comprised between points 0.1 and 2 of the torque/pressure characteristic curve in FIG. 8 (first portion of the curve), the straight step 41a of the intermediate rotor arm 33a (to the right in the figures) and the rounded step 38 of the outlet arm 14 will respectively delimitate with the adjacent closing edge 44a of the passage port 36a and this of the corresponding outlet port 24 a slight restriction which will cause fluid pressure in chamber 43 (left chamber) to rise slightly above that which prevails in the other chamber 43a. This pressure differential will exert on the outlet arm 14 a reaction which is appropriate to straight line running, a condition which is represented by the first horizontal 0.1-2 portion of the characteristic curve.

When the rotor 9 proceeds with its rotational displacement in the direction of the arrows, the bevel or chamfer 37 of inlet arm 13 reaches a position at such a distance of the adjacent closing edge 17 of the inlet port 18 that the thus created restriction will now prevail to cause the pressure in chamber 28 (left chamber) to rise for actuating the driving piston 30 in the required direction. This configuration corresponds to the second portion 2-3 of the characteristic curve, e.g. running in curves of medium-size radius.

When the torque applied to the steering wheel increases so as to exceed point 3 of the characteristic curve and enter the third portion of this curve, the dimension of the restriction created by the step 38 of the outlet arm remains constant, whereas the bevels 37 and 40 of inlet arm 13 and intermediate arm 33, respectively, now cooperate for forming a restriction with the corresponding closing edges of inlet port 18 and passage port 36, respectively. This situation is reflected by portion 3-4 of the characteristic curve. In such a condition, the pressure prevailing inside the working chamber 28 will act accordingly on the drive piston 30, while simultaneously applying, in chamber 43, a reaction against outlet arm 14 which corresponds to driving conditions in sharp curves or parking manoeuvres.

When the driving torque value reaches its maximum (point 4 on the characteristic curve), restrictions 38-40 and 37-17 of outlet arms 14 and inlet arms 13, respectively, will be fully closed, whereby pressures chambers 43 and 28 as well as discharge chambers 43a and 28a will be totally isolated so as to cause the driving piston 30 to be controlled under the full fluid pressure delivered by the pump.

Obviously, when the application of torque to the steering wheel ceases, the recentering or returning devices (not shown) which are normally provided on these distributors will bring the rotor 9 back to its neutral or central position, as illustrated in FIGS. 2 and 3, whereby restoring open center valve communications and bringing back the steering mechanism to its normal, straight running condition.

In the above description, the operation of the distributor has been detailed in connection with a rotational displacement of the rotor in the direction of the arrows. It is clear that a displacement in the opposite direction will produce reactions which will be perfectly symmetrical to those described in the above.

The arrangement according to the present invention further allows for several alternatives: for example, the fluid flow control valve means or restrictions 41a–44a may be formed by a second intermediate arm, or alternatively or in addition, several intermediate arms could be used to achieve intermediate portions of the characteristic curve among the above described portions.

The hydraulic distributor as described is particularly suitable for vehicle power-steering systems, but similar distributors may evidently also be used, subject to adequate modification of details, for other applications where similar conditions of operation are encountered, such as in control systems for machine tools and related types of equipments.

I claim:

1. A rotary hydraulic distributor for hydraulic power-drive system, which comprises two members (1–3, 9) capable of relative rotation one with respect to the other, connectable to an input and an output device, respectively, and which form a substantially disc-shaped cavity (8) which is divided into at least one pair of working chambers (28) by arms (13, 14) which radially protrude from a first one (9) of said members, further including connection means (29) for connecting said working chambers to the respective ends of a double-acting driving cylinder (30), said arms (13, 14) cooperating respectively with inlet (18) and outlet (24) ports formed in the other (1–3) member and having closing edges so as to form fluid flow control valve means for a pressurized fluid originating from a pressure generating source, one (9) of said members having at least one radially extending intermediate arm (33) extending into each working chamber of said pair of working chambers (28) and cooperating with passage ports (36) formed in the other member (1–3) so as to form additional fluid flow control valve means, said valve means associated to said arms being selectively operated in accordance to the relative rotation between said members in order to control selected successive portions (1-2-3-4) of the input driving torque/outlet operating pressure characteristic curve of said distributor, characterized in that a first portion (1–2) of said characteristic curve is controlled by a stepped profile closing edge (41a) of said intermediate arm (33a) which edge is oriented towards said arm (14) which cooperates with said outlet port (24) and by a stepped shaped closing edge (38) of said arm (14) cooperating with said outlet port (24), which edge is oriented towards the adjacent intermediate arm (33) which extends into the preceeding working chamber.

2. The hydraulic distributor according to claim 1, characterized in that said closing edge of said arm (14) which cooperates with said outlet port (24) has a closing edge which is step-shaped (38, 39) with a tread which forms with the closing edge (46) of the associated outlet port (24) a fluid flow passage whose section is larger than the maximum fluid flow passage section defined by said intermediate arm (33a), a riser portion (39) adjacent to said tread (38) forming a closing edge which cooperates with said closing edge of said outlet port (24), so as to define a fluid flow passage whose section is smaller than the corresponding fluid flow passage section which is defined by said intermediate arm (33a) at the transition point between the first (1–2) and second (2–3) portions of said torque/pressure characteristic curve.

3. The hydraulic distributor according to claim 1 or 2, characterized in that said intermediate arms (33) have sides oriented towards said arms (14) associated to said outlet ports (24) and which sides have a stepped profile with a tread (41, 41a) cooperating with the associated closing edge (44a) of the corresponding passage port (36) so as to control the necessary fluid flow to define the first part of said first portion (1–2) of said torque/pressure characteristic curve.

4. The hydraulic distributor according to claim 1, characterized in that said arms (13) which cooperate with said inlet ports (18) have bevelled closing edges (37) which, together with said closing edges of said inlet ports (18), control a second portion (2–3) of said torque/pressure characteristic curve.

5. The hydraulic distributor according to claim 4, characterized in that said intermediate arms (33, 33a) have bevelled closing edges (40) oriented towards said arms (13) which are associated to said inlet ports (18) which control, together with said bevelled closing edges (37) of said arms (13) cooperating with said inlet ports (18), a third section (3–4) of said torque/pressure characteristic curve.

6. A rotary hydraulic distributor for a hydraulic power-drive system, comprising two members (1–3, 9) capable of relative rotation one with respect to the other and connectable to an input and an output device, respectively, and which form a substantially disc-shaped cavity (8) divided into at least one pair of working chambers (28) by arms (13,14) which radially protrude from a first one (9) of said members, further including connection means (29) for connecting said working chambers to the respective ends of a double-acting driving cylinder (30), said arms (13, 14) cooperating respectively with inlet (18) and outlet (24) ports formed in the other (1–3) member and having closing edges so as to form fluid flow control valve means for a pressurized fluid originating from a pressure generating source, one (9) of said members having at least one radially extending intermediate arm (33) extending into each working chamber of said pair of working chambers (28) and cooperating with passage ports (36) formed in the other member (1–3) so as to form additional fluid flow control valve means, said valve means associated with said arms being selectively operated in accordance with the relative rotation between said members in order to control selected successive portions (1-2-3-4) of the input driving torque/outlet operating pressure characteristic curve for said rotary hydraulic distributor, characterized in that a first O-slope portion (1–2) of the characteristic cuve is effected by the combination of an intermediate arm (33a) having a stepped profile including a straight tread (41a) converging with a straight internal riser (42a) oriented toward the arm (14) that cooperates with said outlet port (24) and a stepped-shaped closing edge (38) of the cooperating arm (14), the closing edge (38) disposed toward the adjacent intermediate arm (33).

* * * * *